(No Model.)
G. V. CORNELL.
FASTENING DEVICE FOR HORSE BLANKETS, &c.
No. 576,553.    Patented Feb. 9, 1897.
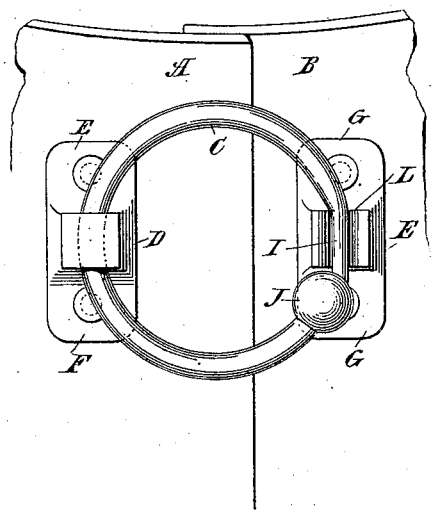
Fig. 1.
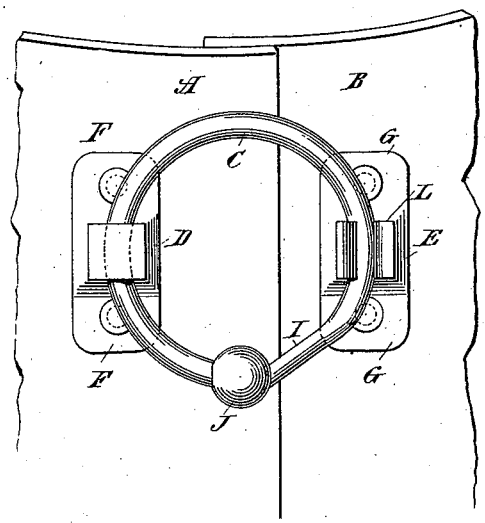
Fig. 2.
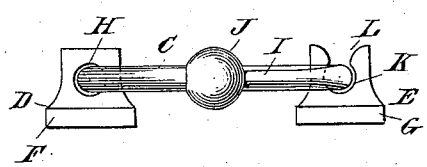
Fig. 3.
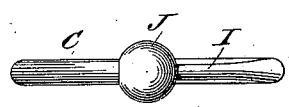
Fig. 4.
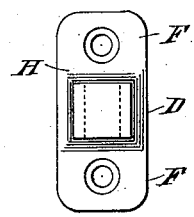
Fig. 5.
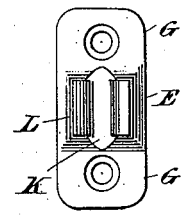
Fig. 7.
Fig. 6.
Fig. 8.
WITNESSES:
William P. Goebel.
E. Jos. Belknap.
INVENTOR
George V. Cornell,
BY Chas. C. Gill
ATTORNEY.

UNITED STATES PATENT OFFICE.

GEORGE V. CORNELL, OF BOUND BROOK, NEW JERSEY.

FASTENING DEVICE FOR HORSE-BLANKETS, &c.

SPECIFICATION forming part of Letters Patent No. 576,553, dated February 9, 1897.

Application filed April 28, 1896. Serial No. 589,365. (No model.)

*To all whom it may concern:*

Be it known that I, GEORGE V. CORNELL, a citizen of the United States, and a resident of Bound Brook, in the county of Somerset and State of New Jersey, have invented certain new and useful Improvements in Fastening Devices for Horse-Blankets and other Purposes, of which the following is a specification.

The invention relates to improvements in fastening devices for horse-blankets and other purposes; and it consists in the fastening means hereinafter described and claimed by which the meeting edges of the blanket may be quickly and conveniently fastened across the neck or chest of the horse or unfastened therefrom.

The object of the invention is to provide fastening means which will dispense with the usual strap-and-buckle attachments on the blankets and obviate all of the objections and inconveniences incidental thereto.

In the preferred embodiment of the invention I provide on one of the meeting edges of the blanket a stud having an eye or aperture in which is loosely hung a weighted ring or link, which at a definite section is of reduced diameter, and on the other meeting edge of the blanket I attach a locking-stud, having an aperture and an entering-slot leading thereto and adapted to receive the reduced section of the said ring or link and also prevent the escape through it of the said ring or link, except when the reduced section thereof is within said aperture in line with said slot. To secure the two edges of the blanket when brought together, the ring is turned in its retaining-stud until its section of reduced diameter is in line with the slot of the other or locking stud, and thereupon said section is moved through said slot and into the aperture communicating therewith, after which the ring or link will be turned to move said section downward and bring its thicker portion into said aperture, said portion in diameter being greater than the width of the said slot and being thereby prevented from escaping through the slot. The meeting edges of the blanket will be thus secured together by the link or ring and its retaining-studs until said ring or link is purposely turned to bring its reduced section in line with the slot of the locking-lug and manually withdrawn from the latter. At its lower side the ring or link is provided with a weight which prevents the reduced section of same from jarring upward to the slot of the locking-stud while the fastening is in use.

The invention will be fully understood from the following description, taken in connection with the accompanying drawings, in which—

Figure 1 is a front elevation of a portion of the meeting edges of a blanket having applied thereto the studs and link embodying my invention, the reduced section of the link being shown in its first position or within the locking-stud. Fig. 2 is a like view of same, but illustrating the link as having been turned to move its reduced section downward from the locking-stud, this figure illustrating the two edges of the blanket as having been fastened together. Fig. 3 is a detached edge view of the link and studs comprising the invention. Fig. 4 is a detached edge view of the link. Fig. 5 is a detached top view of the retaining-stud for the link. Fig. 6 is an edge view of said stud. Fig. 7 is a detached top view of the locking-stud, and Fig. 8 is a detached edge view of same.

In the drawings, A B respectively designate the meeting edges of the blanket; C, the fastening link or ring; D, the retaining-stud for said link or ring, and E the locking-stud. The studs D E are provided with flanges, (lettered F G, respectively,) which are provided to facilitate the securing of said studs to the opposite edges of the blanket by any suitable means. The said flanges may be secured to the blanket by rivets, sewing, or otherwise, as may be preferred, and will be provided with as many apertures as may be desired. The stud D is provided with the substantially vertical aperture H, within which is placed the link or ring C. The link or ring C may be of suitable outline, but is preferably circular in form and is provided with the section I of reduced diameter and with the ball or weight J adjacent to said section. The stud E is provided with the aperture K and with the slot L, leading thereto, the walls of said slot being curved inward toward said aperture K and furnishing guiding-surfaces for directing the section I of the ring to said aperture K. When the stud and link or ring are to be utilized for securing the meeting edges A B of the blanket together, the link or ring will be turned in the aperture H of the stud D until the reduced section I of said link or ring is in line with the stud E, and at such time the said section I will be manually moved through the slot L and into the aperture K of said stud E, as shown in Fig. 1, whereafter the said link or ring will be turned within the apertures H K until the weight J and reduced section I have passed downward and the thicker portion of the said link or ring C will be within the aperture K, as shown in Fig. 2, at which time the said link or ring will effectually secure the meeting edges of the blanket together and be prevented from escaping from the locking-stud E by reason of the fact that the width of the slot L is less than the diameter of the thicker portion of the link or ring C.

In order to free the edges A B of the blanket from one another, the ring C will be turned back to the position in which it is illustrated in Fig. 1, and the reduced section I of said ring manually lifted from the aperture K and entering-slot L. After the edges A B of the blanket have been secured together by means of the link or ring C, as shown in Fig. 2, the weight J will prevent any jarring action from causing the link or ring to rotate sufficiently for the reduced section I thereof to reach and escape from the aperture K and slot. It will be apparent that the fastening device is one of great efficiency, durability, and simplicity, and that it entirely dispenses with the usual strap-and-buckle attachments and all the objections and inconveniences incidental to the use thereof. The link or ring C may not only be moved through the aperture H of the stud D, but may be turned upward thereon after the manner of a hinge, so that the reduced section I may be readily removed from the locking-stud E.

I have illustrated and described my invention as applied to the meeting edges of a horse-blanket; but I do not limit the invention to this special use or to any other special use, since it is obvious that it may be applied for the securing together of various articles.

What I claim as my invention, and desire to secure by Letters Patent, is—

1. The fastening device consisting of the link or ring having a section of reduced diameter, combined with the retaining-stud for said link or ring, the locking-stud having the aperture and slot and the weight carried by said ring; substantially as set forth.

2. The fastening device consisting of the link or ring having the section of reduced diameter, combined with the retaining-stud D having the flanges F and provided with an aperture which receives and retains said link or ring and the locking-stud provided with the flanges G and having the aperture and entering-slot; substantially as set forth.

Signed at New York, in the county of New York and State of New York, this 25th day of April, A. D. 1896.

GEORGE V. CORNELL.

Witnesses:
CHAS. C. GILL,
E. JOS. BELKNAP.